United States Patent [19]

Tirheimer

[11] Patent Number: 4,585,276
[45] Date of Patent: Apr. 29, 1986

[54] SINGLE AND DUAL WHEEL CONFIGURATION FOR VEHICLES

[76] Inventor: Raymond J. Tirheimer, 8510 Cypress Point, Buena Park, Calif. 90621

[21] Appl. No.: 639,810

[22] Filed: Aug. 13, 1984

[51] Int. Cl.$^4$ .............................................. B60B 11/00
[52] U.S. Cl. .............................. 301/36 R; 301/9 DN; 301/128
[58] Field of Search ................ 301/9 DN, 36 R, 40 S, 301/128

[56] References Cited

U.S. PATENT DOCUMENTS

| | | | |
|---|---|---|---|
| 2,619,389 | 11/1952 | James | 301/9 DN X |
| 2,682,430 | 6/1954 | Brubaker | 301/128 X |
| 3,790,218 | 2/1974 | Johns | 301/36 R |
| 4,070,066 | 1/1978 | Reppert et al. | 301/36 R |
| 4,135,765 | 1/1979 | Hardwicke | 301/36 R |
| 4,337,003 | 6/1982 | Juhl | 301/128 X |
| 4,396,232 | 8/1983 | Fox | 301/36 R |

Primary Examiner—David A. Scherbel
Attorney, Agent, or Firm—Edgar W. Averill, Jr.

[57] ABSTRACT

A wheel and hub adapter provides the use of a common wheel structure in either single or dual wheel configurations for a camper, truck or the like. The wheel is reversible for front and rear axle use and includes a large precision sized center aperture with a surrounding plurality of smaller apertures. The hub adapter defines a cylindrical body having an inwardly extending flange which attaches to the conventional wheel studs of the vehicle and an alignment surface on the other end precision fitted to the center aperture of the wheel. A second flange extends outwardly from the adapter body near the precision alignment surface and receives a plurality of fasteners which secure the wheel to the flange. The center aperture and alignment surface cooperate to center the wheel or wheels with respect to the drum.

10 Claims, 6 Drawing Figures

U.S. Patent Apr. 29, 1986 Sheet 1 of 2 4,585,276
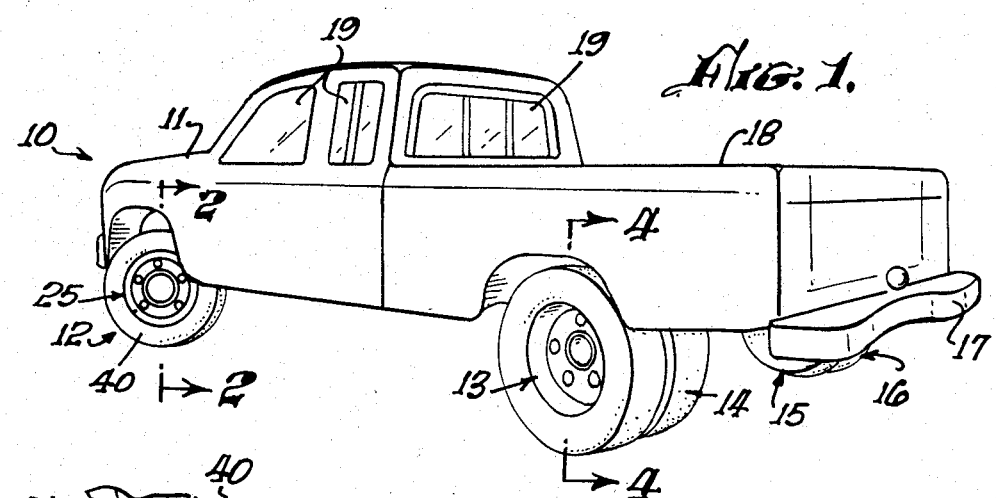
Fig. 1.
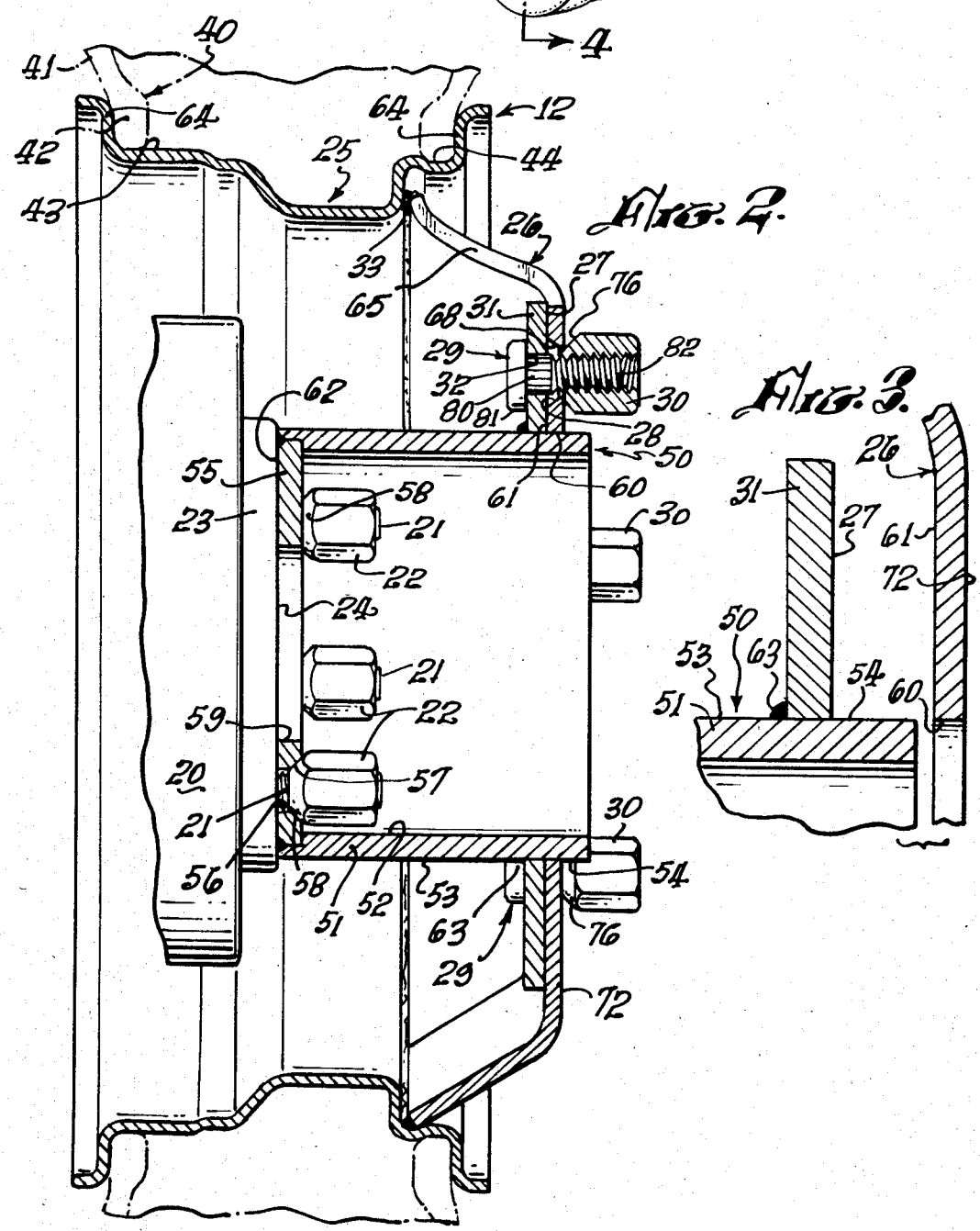
Fig. 2.
Fig. 3.

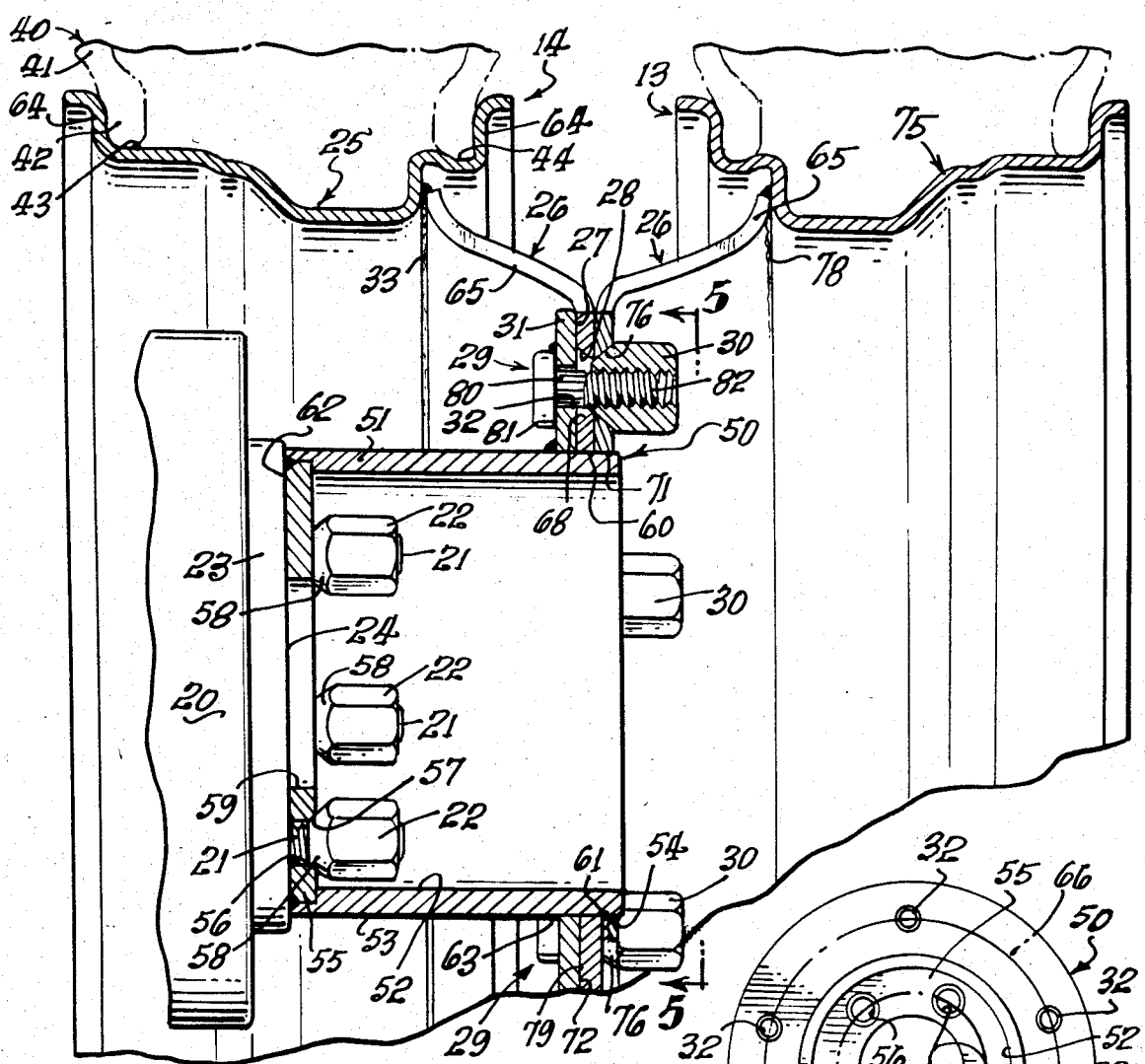
Fig. 4.
Fig. 5.
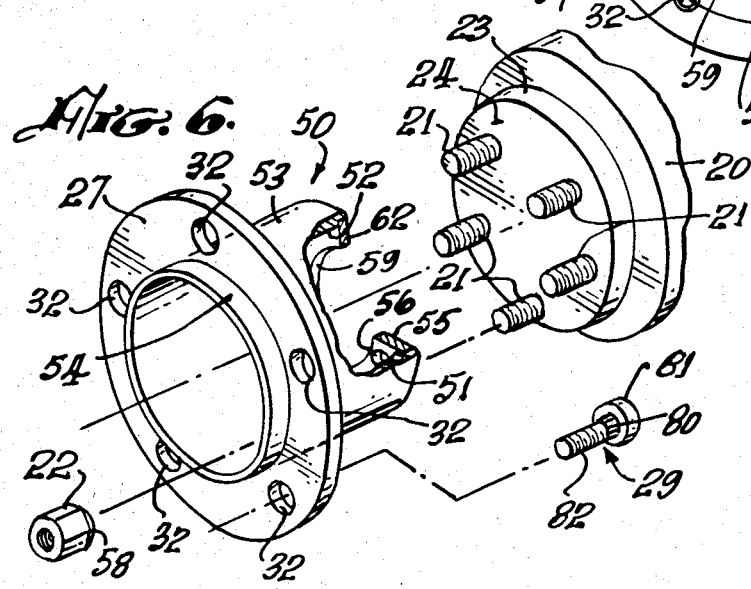
Fig. 6.

SINGLE AND DUAL WHEEL CONFIGURATION FOR VEHICLES

BACKGROUND OF THE INVENTION

This invention relates generally to self-propelled vehicles having dual wheel pairs on at least one axle and particularly to small pickup truck and camper vehicles in which the storage of multiple spare wheels is difficult.

It is often found desirable by truck and camper vehicle users to utilize a dual wheel configuration on the rear drive axle of the vehicle. Such dual wheel configurations are well known in the art and, as the name indicates, comprise an axle combination in which a pair of closely spaced wheels are positioned at each end of the axle combination. Generally, all four wheels on the dual wheel axle are directly driven by the axle structure. As a result, increased load bearing capability is provided since all four wheels share the load previously distributed to two wheels. Further, because the traction surface of the dual wheel pair is approximately twice that of the single wheel pair, increased traction is also obtained. In addition, it is often considered aesthetically desirable among truck and camper enthusiasts to provide such dual wheel pairs.

For these reasons, the majority of truck and camper manufacturers make available an option permitting the customer, at the time of purchase, to select the dual wheel configuration. When so provided, these vehicles are available with a standard single wheel configuration on the front two wheels of the vehicle and a four wheel dual pair arrangement on the rear. Because the wheel structure of the wheels used in dual wheel configurations differs from the wheel structure of the wheels used on the front single wheel configuration, the front and rear wheels are not interchangeable. Among other consequences of this difference in wheel construction is the resulting need for individual spare tires and wheels for the front and rear axles.

While such originally manufactured versions having factory installed dual wheel configurations do provide the increased load-bearing, traction and aesthetic accommodations set forth above, they are subject to several limitations. For example, as set forth above, such vehicles must be earmarked for dual wheel construction during the manufacturing process. Because of the general construction techniques of vehicles, it is generally not feasible to convert such systems subsequent to manufacture. Notwithstanding the expense and difficulty of such subsequent conversion, there remains in addition lack of the interchangeability between front and rear wheel hubs creating the above-mentioned need for two spare wheels. While the accommodation of a second spare wheel is of some difficulty in larger trucks and camper vehicles, it is often prohibitive for small trucks and campers due to the limited space available.

In view of the foregoing, it is clear, therefore, that there remains a need in the art for a ready means of converting a standard single wheel truck or camper to a dual wheel vehicle with a minimum of work and cost and without creating the need for carrying a second spare wheel.

SUMMARY OF THE INVENTION

Accordingly, it is a general object of the present invention to provide an improved dual wheel configuration for truck and camper vehicles. It is a more particular object of the present invention to provide an improved dual wheel configuration for truck or camper vehicles which may be installed without excessive expense subsequent to manufacture and which does not create the necessity of carrying a second spare wheel.

The present invention is for a wheel and hub adapter for use in combination with motor vehicles having drum or hub assemblies which include a generally flat mounting plate and a circular arrangement of wheel studs extending outwardly therefrom which are concentrically spaced from the center line of the vehicle axle and adapted to receive a wheel having an arrangement of apertures spaced in accordance with the wheel studs. The wheel includes a circular outer rim configured to receive a vehicle tire and a mounting surface coupled to the outer rim in an offset manner by a wheel web. The mounting surface of the wheel defines a center aperture concentric with the outer rim and a plurality of apertures arranged about the center aperture. The plurality of apertures is positioned about a circle concentric with the center aperture. A hub adapter is positioned between the drum assembly and the wheel and has a generally cylindrical wall portion terminating at one end in a planar surface having a plurality of apertures spaced from the center of the cylindrical surface on a uniform radius and adapted to receive the mounting studs of the vehicle drum assembly. The other end of the hub adapter has an alignment surface concentric with the axis of the cylindrical wall portion said alignment surface having a predetermined diameter. The hub adapter further has a wheel flange, spaced from the alignment surface by a uniform distance, extending outwardly therefrom, and has a second plurality of apertures uniformly spaced from the alignment surface on a circle concentric with the alignment surface whereby the adapter hub is secured to the vehicle drum and one or two wheels may be secured to the adapter flange. In the event a second wheel is used, its orientation is reversed from that of the first wheel and secured to the same flange.

BRIEF DESCRIPTION OF THE DRAWINGS

The features of the present invention which are believed to be novel are set forth with particularity in the appended claims. The invention together with further objects and advantages thereof may best be understood by reference to the following description taken in conjunction with the accompanying in the several figures of which like reference numerals identify like elements and in which:

FIG. 1 is a perspective of a motor vehicle having a dual wheel configuration in accordance with the present invention;

FIG. 2 is a section view along the section lines 2—2 of FIG. 1;

FIG. 3 is a partial section view of the mounting detail of the adapter and wheel of FIG. 2;

FIG. 4 is a partial section view taken along section lines 4—4 of FIG. 1;

FIG. 5 is a plan view of the adapter hub of the present invention with the wheel removed; and FIG. 6 is a perspective exploded view of the present invention adapter hub and the vehicle drum.

DESCRIPTION OF THE PREFERRED EMBODIMENTS

FIG. 1 shows a pickup truck vehicle generally described by reference numeral 10 having a body 11 and supporting a front wheel 12, a second front wheel, (not visible), a bed 18, used generally to transport cargo, a bumper 17 and a plurality of windows 19. In accordance with the present invention, vehicle 10 further includes an outer rear wheel 13 and inner rear wheel 14 and inner rear wheel 15 and an outer rear wheel 16. Rear wheels 13 through 16 comprise a dual wheel combination constructed in accordance with the present invention. As can be seen, wheels 13 and 14, and 15 and 16, respectively, are paired at opposite ends of the axle configuration (not shown) of truck 10. With reference to FIG. 1 and as will be more clear in the accompanying descriptions below in connection with subsequent figures, front wheel 12 and outer rear wheels 13 and 16 are reversed with respect to the mounting surface of vehicle 10.

The rear wheels 13, 14, 15 and 16 provide the above described advantages of a dual wheel configuration while front wheel 12 and the corresponding but not visible other front wheel of the vehicle 10 are mounted in accordance with the present invention system to position the front wheels relative to the vehicle in accordance with the standard single wheel mount of the vehicle.

With reference to FIG. 2, the present invention wheel and adapter are shown in greater detail. A brake drum 20 which is of standard vehicle construction, defines a drum extension 23 which in turn defines a substantially planar hub mating surface 24 and a plurality of outwardly extending wheel studs 21. The latter extend away from hub mating surface 24 and are perpendicular thereto and, as is better shown in FIG. 6, are equally spaced about a bolt circle which is concentric with the center line of drum 20. It should be apparent to those skilled in the art that drum 20 can be replaced by the rotor assembly of a disc brake without departing from the scope of the present invention. An adapter 50 is constructed in accordance with the present invention and defines a cylindrical extension wall 51 which in turn defines an outer surface 53 and an inner surface 52 and an inwardly extending stud flange 55. The latter defines a drum mating surface 62, a central clearance aperture 59 and a plurality of stud apertures 56. Apertures 56 are concentrically spaced about the center line of adapter 50 such that the center line of adapter 50 is aligned with the center of brake drum 20 and drum extension 23 and in a manner corresponding to the spacing between wheel studs 21 of drum extension 23. Stud apertures 56 further define chamfers 57 which extend away from drum mating surface 62. A plurality of lug nuts 22 are internally threaded in accordance with standard construction and define conical surfaces 58 having a slope corresponding to chamfer 57. In accordance with conventional assembly practices, lug nuts 22 are threaded upon wheel studs 21 and tightened to a specified torque impressing conical surfaces 58 against chamfers 57 and maintaining adapter 50 against drum extension 23. As will be apparent to those skilled in the art, the combination of chamfers 57 and conical surfaces 58 in the foregoing prevent lug nut loosening and assure that the alignment of adapter 50 with respect to drum extension 23 is correct and repeatable during removal and mounting of adapter 50. The importance of this will be discussed below in greater detail. However, suffice it to say here that adapter 50 may as a result be repeatedly removed and mounted to drum extension 23 with assurance that each mounting will result in centering adapter 50 with respect to the center line of drum extension 23.

Adapter 50 further defines an alignment surface 54 at the end of adapter 50 most remote from stud flange 55 which is formed in a precision manner to insure that alignment surface 54 is concentric with the bolt circle of wheel studs 21. Adapter 50 further defines an outwardly extending wheel flange 31 which is attached to and extends orthogonally away from outer surface 53 and alignment surface 54. Wheel flange 31 further includes a plurality of apertures 32 which are spaced equally about wheel flange 31 and are located in a circular arrangement which is concentric with the alignment surface 54. A plurality of adapter bolts 29 extend through apertures 32 and are received by a plurality of adapter nuts 30. Adapter nuts 30 are of similar construction to lug nuts 22 and define conical surfaces 76. Adapter bolts 29 may be of standard construction and freely fit within apertures 32 or in the alternative may be press fitted into apertures 32 in a manner similar to that used in motor vehicle construction.

Front wheel 12 further includes a wheel rim generally described by reference numeral 25 which supports tire 40. Wheel rim 25 further includes a bead side wall portion 64 and a bead seat 43. Tire 40 includes a tire side wall 41 and a tire bead 42 and in accordance with typical motor vehicle tire mounting practices, tire 40 is maintained upon wheel rim 25 by the seal created between tire bead 42 and bead seat 43. Again, in accordance with commonly used motor vehicle tire mounting practice, tire 40 is inflated to a suitable pressure and the seal between tire bead 42 and bead seat 43 creates a force against the interior of tire side wall 41 and tire bead 42 urging tire bead 42 against bead side wall 64. Wheel 12 further includes a wheel web 26 of generally cone shaped configuration which is attached to wheel rim 25 by a weld seam 33 and which defines a plurality of cooling apertures 65. Wheel web 26 further defines a centering aperture 60 which, in accordance with an important aspect of the present invention, is concentric with wheel rim 25 and carefully sized to fit about alignment surface 54 of adapter 50 with a minimum of clearance. Wheel web 26 also defines a plurality of bolt apertures 28 spaced at uniform distances from centering aperture 60 and located in correspondence to the spacing of adapter bolts 29. Bolt apertures 28 further define chamfers 68 the importance of which will be described below in detail. Wheel web 26 also defines a flange mating surface 61 which is generally perpendicular to the center line of centering aperture 60 and which extends outwardly from centering aperture 60 beyond wheel mating surface 27 of wheel flange 31.

In accordance with the present invention, wheel 12 is mounted to adapter 50 by sliding centering aperture 60 over alignment surface 54 until flange mating surface 61 of web 26 contacts wheel mating surface 27 of flange 31. Thereafter, adapter nuts 30 and adapter bolts 29 are threaded together with adapter bolts 29 extending through apertures 32 and bolt apertures 28. Adapter nuts 30 are torqued to a specified tightness in which conical surfaces 76 are pressed into bolt apertures 28 pressing flange mating surface 61 and wheel mating surface 27 together.

FIG. 3 sets forth the alignment aspects of the present invention wheel and hub configuration in greater detail.

FIG. 3 shows a portion of wheel flange 31 which, as mentioned, defines a wheel mating surface 27. Also shown is a portion of extension wall 51 of adapter 50 which defines alignment surface 54. Flange 31 is perpendicular to alignment surface 54 and is attached to adapter 50 by a welded seam 63. Also shown in FIG. 3 is a portion of wheel web 26 which, as mentioned, defines a generally flat flange mating surface 61 and a centering aperture 60. Because the diameter of centering aperture 60 is carefully controlled, a minimum clearance between centering aperture 60 and alignment surface 54 when wheel 12 is mounted to adapter 50 is achieved. In accordance with an important aspect of the present invention, the close tolerances of size and concentricity maintained between centering aperture 60 and alignment surface 54 are the dominant locating and centering mechanism for the present invention wheel and hub combination. With the relative diameters of centering aperture 60 and alignment surface 54 maintained, the centering of wheel 12 upon adapter 50 and therefore brake drum 20 is assured and the combination of adapter bolts 29, adapter nuts 30 and apertures 32 and 28 need only maintain a compressive force upon wheel flange 31 and wheel web 26 to complete the positive mounting of wheel 12 upon adapter 50. As will be described below in greater detail but which bears mention at this point, in accordance with an important aspect of the present invention, those skilled in the art will observe that the proper centering of wheel 12 with respect to adapter 50 is maintained regardless of whether wheel 12 is mounted to adapter 50 in the front single wheel configuration shown in FIG. 2 or the reverse position occupied by outer rear wheel 13 in FIG. 4. This important result flows from the fact that the centering of wheel 12 upon adapter 50 results from the close tolerances between centering aperture 60 and wheel alignment surface 54. In other words, wheel centering is virtually independent of the relationships between adapter bolts 29, adapter nuts 30 and apertures 32 and 28.

Returning to FIG. 2, it will be apparent to those skilled in the art that the incline of web 26 and the offset relationship between flange mounting surface 61 and wheel rim 25 is selected in accordance with the spacing between stud flange 55 and wheel flange 31 of adapter 50. In other words, the plane of tire 40 and wheel rim 25 is located or positioned with respect to hub mating surface 24 of drum extension 23 to maintain the same relationship between tire 40 and brake drum 20 achieved when tire 40 was supported by a conventional wheel upon brake drum 20.

FIG. 4 shows the mounting details of a dual wheel combination of inner wheel 14 and outer rear wheel 13. For purposes of clarity of explanation, the brake drum and adapter shown in FIG. 4 are assumed to be of the same construction as that used in the front wheel combination shown in FIG. 2. Accordingly, brake drum 20, drum extension 23 and adapter 50 as well as the details thereof retain the same reference numbers as those of adapter 50 and brake drum 20 in FIG. 2.

Because inner rear wheel 14 is constructed and mounted upon adapter 50 in the same manner as that set forth above for front wheel 12 described in connection with FIG. 2, the same reference numerals are used in FIG. 4 to identify the corresponding structural features of inner rear wheel 14 as are used for front wheel 12. Accordingly, reference should be taken to the descriptions above for the details of structure and mounting of inner rear wheel 14.

Outer rear wheel 13 is identical to both front wheel 12 and inner rear wheel 14 and includes a wheel rim 75 which supports a conventional tire in the manner set forth above for tire 40 upon front wheel 12. Outer rear wheel 13 further defines a wheel web 70 having an identical construction to wheel web 26 which is welded to wheel rim 75 along welded seam 78 and which defines a flange mounting surface 79 which in turn defines a plurality of bolt apertures 74. The latter define a chamfers 69, the importance of which will be described below in detail. Wheel web 70 further defines a centering aperture 71 which corresponds to centering aperture 60 of wheel web 26. As will be apparent to those skilled in the art by examination of FIG. 4, outer rear wheel 13 is positioned upon adapter 50 in the reverse relationship to that which exists between inner rear wheel 14 and adapter 50.

In accordance with the present invention, the dual wheel configuration shown is achieved by initially sliding inner rear wheel 14 upon adapter 50 such that alignment surface 54 passes through centering aperture 60 and wheel mating surface 27 of wheel flange 31 and flange mating surface 61 of wheel web 26 are brought into contact. Thereafter, outer rear wheel 13 is mounted to adapter 50 in the reverse position shown by sliding center aperture 71 over alignment surface 54 until inner wheel surfaces 72 and 73 of wheel webs 26 and 70 respectively are brought into contact. Adapter nuts 30 are then threaded upon adapter bolts 29 until conical surfaces 76 of adapter nuts 30 contact chamfers 69 of bolt apertures 74. Adapter nuts 30 are then tightened to the appropriate torque specification to maintain wheel flange 31 and wheel webs 26 and 70 in compression.

As will also be apparent to those skilled in the art, the cooperation of centering apertures 60 and 71 and alignment surface 54 of adapter 50 maintain both inner rear wheel 14 and outer rear wheel 13 in a properly centered alignment with respect to adapter 50 and brake drum 20 of the vehicle. In accordance with an important aspect of the present invention, and because outer rear wheel 13, inner rear wheel 14 and front wheel 12 are commonly structured, that is have structures and shapes which are identical, the respective wheels on both the single wheel configuration in the front of vehicle 10 and those on the dual wheel configuration in the rear are completely interchangeable. Therefore, a single spare wheel constructed in accordance with the structure of wheels 12 through 16 may be used anywhere on truck 10 in either the dual or single wheel arrangements of the vehicle. As a result, a single spare wheel may be used notwithstanding the dual wheel configuration of the vehicle. It will also be apparent to those skilled in the art that the dual wheel combination of vehicle 10 may be easily returned to a single wheel configuration by the simple removal of outer rear wheels 13 and 16 leaving vehicle 10 with a conventional four wheel arrangement.

Turning to FIG. 5, the details of adapter 50 may be examined with particular attention to the concentric relationships described above. As can be seen, wheel flange 31 is of circular configuration and accommodates the plurality of apertures 32 in an equally spaced relationship about hole circle 66. As discussed above, apertures 32 are equally spaced from alignment surface 54. Alignment surface 54 and inner surface 52 of extension wall 51 are, of course, also of circular configuration. In addition, stud flange 55 extends inwardly from inner surface 52 and terminates in a circular clearance aperture 59. Stud apertures 56 are equally spaced upon stud flange 55 about hole circle 57. As discussed above, hole circles 66 and 67 are concentric with alignment surface 54 to maintain the proper alignment between the wheel (or wheels if a dual wheel is used) mounted to adapter 50 and the brake drum of the vehicle.

Turning to FIG. 6 which sets forth in a partial exploded view of the relationship between adapter 50 and brake drum 20 of vehicle 10, it is shown that adapter 50 is mated to hub mounting surface 24 of drum extension 23 by sliding stud apertures 56 over wheel studs 21. Thereafter, lug nut 22 is placed upon each of wheel studs 21 in the manner described above. In the embodiment shown in FIG. 6, apertures 32 do not support adapter bolts 29. As mentioned above, there are alternative configurations by which adapter bolts 29 may be passed through apertures 32 of adapter 50 without departing from the spirit and scope of the present invention. In the anticipated embodiment shown, adapter bolts 29 each define knurled portions 80 interposed between threads 82 and heads 81, the size of which is selected with respect to aperture 32 to provide a press, or interference, fit therebetween. Accordingly, in this embodiment, adapter bolt 29 is maintained within aperture 32 of flange 31. In an alternative embodiment (not shown), adapter bolt 29 has a conventional smooth shank instead of knurl 80 and is fitted within aperture 32 in a conventional manner. In the latter case, however, care is nonetheless required to properly select the size of aperture 32 with respect to the shank of adapter bolt 29 to maintain clearances therebetween at a minimum.

Examination of the foregoing inventive structure reveals several advantages over conventional wheel structures. For example, it should be noted that a single uniform wheel construction may be employed in which all wheels are interchangeable upon the vehicle. In accordance with this important advantage, a single spare wheel is able to fit both single and dual wheel configurations and front and rear axles. In addition, the common wheel construction permits ready conversions between single and dual wheel configurations on the vehicle by the simple removal of the outer ones of the rear wheel pairs. Further, it will also be apparent that a common wheel structure may be utilized on a plurality of vehicle types provided that a corresponding adapter may be configured to receive the common wheel on the various types of vehicles. In other words, a single wheel structure may be used with several types of vehicles and an adapter particular to the differences between vehicles may be used to accommodate these changes. This is extremely advantageous over the alternative of having different wheel constructions for each of the different types of vehicles. Finally, it will be apparent that the present invention system is totally compatible with the standard manufacture of motor vehicles and that no modification to the existing motor vehicle need be made to convert such vehicle to the present invention wheel and hub structure apart from the removal of the existing wheels from the vehicle.

Accordingly, what has been shown and described herein is an improved wheel and adapter hub combination which may be used to convert a standard single wheel motor vehicle to a dual wheel construction without the necessity of additional spare wheels or modification of the vehicle itself.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. For use in a motor vehicle having a rotatable drum and circular array of wheel studs, a vehicle wheel mounting system comprising:

a cylindrical adapter hub having a cylindrical body defining inner and outer surfaces and first and second ends, a drum flange extending inwardly from said first end and defining a first plurality of apertures spaced in a circular array corresponding to that of said wheel studs, said wheel studs passing through said first plurality of apertures, a wheel mounting flange, extending outwardly from said outer surface near said second end, defining a second plurality of apertures arranged in a circular array, and an alignment surface having a predetermined outer diameter and extending from said wheel mounting flange to said second end;

a first plurality threaded fasteners cooperating with said plurality of wheel studs to secure said drum flange to said rotatable drum;

a first wheel having first tire supporting means for receiving and supporting a first tire and defining a substantially planar first hub mounting surface configured to be mateable with said wheel mounting flange and defining a third plurality of apertures spaced in a circular array corresponding to that of said second plurality of apertures in said wheel mounting flange, and a first centering aperture centered within said wheel and having a predetermined inner diameter;

a first plurality of threaded bolts passing through said second and third pluralities of apertures; and a second plurality of threaded fasteners cooperating with said first plurality of bolts when said wheel is mounted to said cylindrical adapter hub to secure said first hub mounting surface to said wheel mounting flange, said alignment surface extending through said first centering aperture to center and support said first wheel with respect to said cylindrical adapter hub;

said circular array of said wheel studs said first, second and third pluralities of apertures, said first centering aperture and said alignment surface all being substantially concentric.

2. A vehicle mounting system as set forth in claim 1 wherein each of said apertures in said first plurality of apertures define a chamfered surface and wherein said threaded fasteners in said first plurality of threaded fasteners each define a cone shaped surface, said chamfers and cone shaped surfaces cooperating to accurately center and securely maintain said cylindrical hub adapter with respect to said circular array of wheel studs.

3. A vehicle mounting system as set forth in claim 2 wherein said wheel defines an axis of rotation extending through its center and wherein said first tire supporting means and said first hub mounting surface are offset in the direction of said axis of rotation, by a predetermined distance and wherein said first wheel includes:

a wheel web defining a generally cone shaped member having a larger outer diameter attached to said tire supporting means and a smaller inner diameter attached to said first hub mounting surface.

4. A vehicle mounting system as set forth in claim 3 wherein said first wheel has a substantially constant material thickness in the region of said first hub mounting surface and wherein said wheel mounting flange is spaced from said second end of said cylindrical hub adapter by a distance exceeding twice said material thickness.

5. A vehicle mounting system as set forth in claim 4 further including a second wheel having second tire supporting means, a second centering aperture, and a second hub mounting surface defining a fourth plurality of apertures, said second wheel being of identical construction as said first wheel and mounted to said cylindrical adapter hub in such manner that said alignment surface extends through said second centering aperture and said second tire supporting means is offset from said second hub mounting surface in the direction along said axis of rotation opposite to the offset between said first tire supporting means and said first hub mounting surface.

6. A vehicle mounting system as set forth in claim 5 wherein said first plurality of threaded bolts extends through said second, third and fourth pluralities of apertures and wherein said second plurality of threaded fasteners cooperate with said first plurality of threaded bolts to mutually secure said first and second hub mounting surfaces and said wheel mounting flange.

7. A vehicle mounting system as set forth in claim 6 wherein said wheel webs define cooling apertures.

8. A vehicle mounting system for use in combination with a vehicle having wheel mounting means which include a substantially planar surface supporting a plurality of outwardly extending wheel studs equally spaced in a circular array, said vehicle mounting system comprising:
  an adapter including,
    a hollow cylindrical body defining first and second ends,
    a hub flange extending inwardly from said first end and defining a first plurality of apertures spaced in a circular array corresponding to that of said wheel studs,
    a wheel flange extending outwardly from said cylindrical body and attached thereto spaced from said second end and defining a second plurality of apertures equally spaced in a circular array,
    an alignment surface extending from said wheel flange to said second end and having a predetermined outside diameter,
    said alignment surface and said circular arrays of first and second pluralities of apertures being concentric;
  a first plurality of threaded fasteners compatible with said wheel studs;
  a first plurality of bolts press fitted within said second plurality of apertures and extending toward said second end;
  a second plurality of threaded fasteners compatible with said first plurality of bolts;
  said adapter being assembled to said vehicle wheel mounting means by passing said first plurality of apertures over said wheel studs and tightening said first plurality of threaded fasteners upon said wheel studs to secure said hub flange against said substantially planar surface; and
  a wheel having,
    means for receiving and supporting a tire,
    a generally cone shaped web portion extending inwardly from said means for receiving and supporting a tire and defining a centering aperture located in the center of said wheel, and
    a hub mounting surface encircling said centering aperture, said hub mounting surface being compatible with said substantially planar surface and defining a third plurality of apertures;
  said wheel being assembled to said adapter by passing said alignment surface through said centering aperture whereby said alignment surface aligns and supports said wheel and said first plurality of bolts through said third plurality of apertures until said wheel flange abuts said hub mounting surface and tightening said second plurality of threaded fasteners upon said second plurality of bolts to secure said wheel flange to said hub mounting surface.

9. A vehicle mounting system as set forth in claim 8 further including a second wheel substantially identical to said first wheel wherein said first and second wheels are each supported upon said alignment surface and have their respective web portions oppositely oriented to permit their respective hub mounting surfaces to meet and wherein said second plurality of bolts extends through the apertures in the hub mounting surfaces of said first and second wheels to secure said first and second wheels serially to said wheel flange in a dual wheel arrangement.

10. A wheel and hub adapter combination for use on a motor vehicle having four wheel mounting structures each having a planar rotatable wheel receiving surface and a plurality of outwardly extending wheel studs spaced in a circular array, said wheel and hub adapter combination permitting a plurality of wheels having a common structure to be used at all four wheel mounting structures and permitting said wheels to be combined in pairs on said wheel mounting structures to form dual wheel configurations, said wheel and hub adapter combination comprising:
  four hub adapters each having means for being securely mounted to one of said wheel mounting structures and each defining a cylindrical center alignment surface having a predetermined outside diameter;
  six commonly constructed wheels each having means for supporting a tire and each having a center aperture having an inside diameter selected to provide a precision fit to said cylindrical center alignment surface of said hub adapters; and
  retainer means for laterally securing one or more of said wheels to said wheel mounting structures;
  said commonly structured wheels being selectively mountable to said hub adapters either singly or in pairs by sliding said center aperture of each wheel over said cylindrical center alignment surface of said hub adapters and engaging said retainer means whereby said wheels are laterally secured by said retainer means and radially maintained, supported and aligned by the cooperation of said cylindrical center alignment surfaces and said center apertures of said wheels.

* * * * *